US010555465B2

(12) United States Patent
Agrey et al.

(10) Patent No.: US 10,555,465 B2
(45) Date of Patent: Feb. 11, 2020

(54) SINGLE STEP HYDROPONIC PLANTING CUP

(71) Applicants: Ryan Richard Louis Agrey, Edson (CA); Bradley George Agrey, Edson (CA)

(72) Inventors: Ryan Richard Louis Agrey, Edson (CA); Bradley George Agrey, Edson (CA)

(*) Notice: Subject to any disclaimer, the term of this patent is extended or adjusted under 35 U.S.C. 154(b) by 49 days.

(21) Appl. No.: 15/359,424

(22) Filed: Nov. 22, 2016

(65) Prior Publication Data

US 2018/0139914 A1 May 24, 2018

(51) Int. Cl.
*A01G 31/02* (2006.01)
*A01G 22/00* (2018.01)
*A01G 24/00* (2018.01)
*A01G 9/029* (2018.01)
*A01G 31/00* (2018.01)

(52) U.S. Cl.
CPC .......... *A01G 31/02* (2013.01); *A01G 9/0293* (2018.02); *A01G 22/00* (2018.02); *A01G 24/00* (2018.02); *A01G 31/00* (2013.01)

(58) Field of Classification Search
CPC .................................................. A01G 31/02
USPC ................................................... 47/63
See application file for complete search history.

(56) References Cited

U.S. PATENT DOCUMENTS

| 3,534,498 A | | 10/1970 | Herrli | |
|---|---|---|---|---|
| 3,973,355 A | * | 8/1976 | McKenzie | A01G 24/28 47/59 R |
| 4,403,446 A | * | 9/1983 | Wolfe | A01G 24/00 47/62 R |
| 5,099,609 A | | 3/1992 | Yamauchi | |
| 5,168,664 A | | 12/1992 | Deutschmann, Sr. | |
| 5,557,885 A | | 9/1996 | Sledge | |
| 6,112,457 A | * | 9/2000 | Kohno | A01C 1/06 47/57.6 |
| 6,176,037 B1 | * | 1/2001 | Muramatsu | A01G 9/0293 47/64 |
| 6,219,968 B1 | * | 4/2001 | Belger | C09K 17/52 47/74 |
| 6,678,996 B1 | * | 1/2004 | Visser | A01G 24/00 47/59 S |
| 7,249,440 B2 | * | 7/2007 | Caron | A01G 9/02 47/66.6 |
| 8,528,252 B2 | | 9/2013 | Griebel | |
| 2005/0241231 A1 | | 3/2005 | Bissonnette | |
| 2005/0252080 A1 | | 11/2005 | Wright | |
| 2007/0283622 A1 | * | 12/2007 | Matsumura | A01G 31/02 47/59 R |

(Continued)

FOREIGN PATENT DOCUMENTS

EP 1900275 3/2008

*Primary Examiner* — Tien Q Dinh
*Assistant Examiner* — Ebony E Evans
(74) *Attorney, Agent, or Firm* — Integrity Patent Group, PLC; Charles E. Runyan

(57) ABSTRACT

A hydroponic planting cup system includes a body, a first-inner-volume, and a second-inner-volume. The hydroponic planting cup system is useful for eliminating the need to transplant which effectively avoids the high risk of plants dying during the transplanting process in hydroponics. The hydroponic planting cup system is a single step process of growing plants in a hydronic system.

19 Claims, 5 Drawing Sheets

(56) References Cited

U.S. PATENT DOCUMENTS

2010/0325952 A1* 12/2010 Young .................... A01G 27/02
                                                              47/81
2013/0333780 A1    12/2013 Chan
2018/0054981 A1*   3/2018 Work .................... A01M 29/34

* cited by examiner

SINGLE STEP HYDROPONIC PLANTING CUP

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of hydroponics and more specifically relates to hydroponic planting cups.

2. Description of Related Art

Hydroponics is a subset of hydroculture, the method of growing plants without soil, using mineral nutrient solutions in a water solvent. Terrestrial plants may be grown with only their roots exposed to the mineral solution, or the roots may be supported by an inert medium, such as perlite or gravel. The nutrients in hydroponics can be from fish waste, duck manure, or normal nutrients. A variety of techniques (i.e. Nutrients Film Technique, static solution culture, etc.) are utilized with hydroponics.

In agriculture and gardening, transplanting or replanting is the technique of moving a plant from one location to another. Most often this takes the form of starting a plant from seed in optimal conditions, such as in a hydroponic system, then replanting it in another. This is common in market gardening and truck farming, where setting out or planting out are synonymous with transplanting. In the horticulture of some ornamental plants, transplants are used infrequently and carefully because they carry with them a significant risk of killing the plant. Therefore, a solution is desired to eliminate the risk of killing the plant by eliminating the need to transplant.

U.S. Pat. No. 5,168,664 to Gary V. Deutschmann relates to a hydroponic growing system with improved light/water meter. The described hydroponic growing system with improved light/water meter includes a hydroponic planter that includes an outer container and an inner liner. The liner includes a central inverted cup-shaped reservoir for a liquid nutrient solution. The outer wall of the liner includes slots extending substantially above the height of the reservoir, to provide aeration of the roots of plants growing in the planter. A combined light and liquid level indicator determines the minimum amount of light in which the planter can be placed, shows when to add nutrient solution to the planter, and indicates when too little, sufficient or too much nutrient solution has been added. The light/liquid level monitor includes three light-transmitting rods of different lengths extending between the outer container and the liner; one extends to the bottom of the liner, another to below the top of the reservoir, and the third to near the top of the reservoir. The rods have flat upper indicating surfaces and conical ends so that the indicating surface becomes dark in appearance when the conical end is immersed in liquid.

BRIEF SUMMARY OF THE INVENTION

In view of the foregoing disadvantages inherent in the known hydroponic planting cup art, the present disclosure provides a novel hydroponic planting cup system. The general purpose of the present disclosure, which will be described subsequently in greater detail, is to provide a hydroponic planting cup system.

A hydroponic planting cup system is disclosed herein. The hydroponic planting cup system includes a body having an outer-surface, a hollow first-inner-volume with an inner-surface integral to the body including a bottom-opening configured to allow or remove nutrient solution from the first-inner-volume, a second-inner-opening with dimensions smaller than the bottom-opening, and at least one medium having wicking and anti-fungal properties. A hollow second-inner-volume is configured to provide smaller dimensions and in linear alignment above the first-inner-volume which forms a coupling through the second-inner-opening. The second-inner-volume provides an outer-opening at the top of the body and is configured to allow a developing plant access through and outside of the body.

According to another embodiment, a hydroponic planting cup system is also disclosed herein. The hydroponic planting cup system includes the body that is cylindrical. Further, the body includes a circular-top and a circular-base, where the bottom-opening is a partial aperture in the circular-base of the body. The circular-top and the circular-base have equal diameter as the body. Moreover, the circular-top integrates the outer-opening. The body may be designed to be submerged partially by the nutrient solution. Due to external movement around the hydroponic planting cup, such as motion from the nutrient solution, the body may be constructed of solid material to prevent tipping or misplacement. Also, the body may be water-resistant. The at least one medium may be material that add additional properties to the growth of the plant. Further, the bottom-opening may allow access to exchange the at least one medium. The at least one medium may receive a planting seed. Finally, the outer-surface is preferably opaque in order to reflect sunlight.

According to another embodiment, a hydroponic planting cup system is also disclosed herein. The hydroponic planting cup system includes placing the hydroponic planting cup in the hydroponic system, and planting the seed through the outer-opening in the at least one medium.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a hydroponic planting cup system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a hydroponic planting cup and more particularly to a hydroponic planting cup system as used to improve the hydroponic system and more specifically to the desire of eliminating the transplanting step in hydroponic plant systems.

Generally, the hydroponic planting cup is a single step process that allows for the simplistic growth of a plant in hydroponics. This single step process removes the need for transplanting which has a high risk of failure. The present disclosure reduces the potential damage the plant can experience through transplanting and allows for germination success. The hydroponic planting cup is designed for a variety nutrient distribution systems, but most notably for Nutrients Film Technique (NFT). The hydroponic planting cup system is designed to regulate the pH, circulation rate, nutrient intake, dissolved oxygen, and total dissolved solids. Following the simple preparation of the hydroponic planting cup system, will provide users a simple assemble for growing plants in hydroponics than what is currently on the market.

Figure 1:
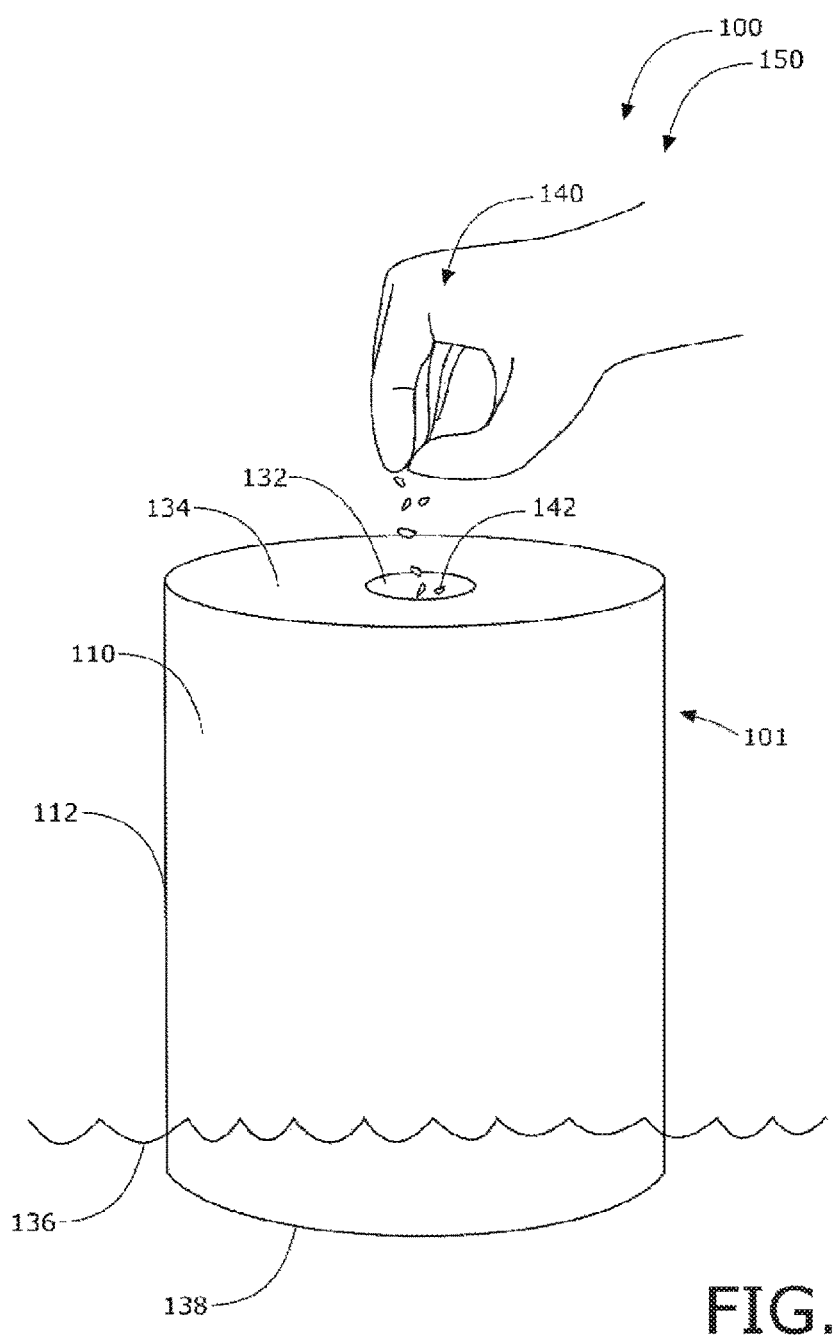
FIG. 1 is a perspective view of the hydroponic planting cup system during an 'in-use' condition, according to an embodiment of the disclosure.

Referring now more specifically to the drawings by numerals of reference, there is shown in FIGS. 1-4, various views of a hydroponic planting cup system 100. FIG. 1 shows a hydroponic planting cup system 100 during an 'in-use' condition 150, according to an embodiment of the present disclosure. Here, the hydroponic planting cup system 100 may be beneficial for use by a user 140 by removing the transplanting action in hydroponic systems that may result with an increase for the success rate of a planting seed 142 while decreasing the difficulty for the user 140.

As illustrated, the hydroponic planting cups system 100 may include a body 110 having an outer-surface 112, a hollow first-inner-volume 120 with an inner-surface 122 integral to the body 110. Further, a bottom-opening 124 is configured to allow or remove nutrient solution 136. The first-inner-volume 120, has a second-inner-opening 126 with dimensions smaller than the bottom-opening 124, and at least one medium 128 having wicking and anti-fungal properties may be included in the first-inner-volume 120. A hollow second-inner-volume 130 may also be included and configured to provide smaller dimensions and in linear alignment above the first-inner-volume 120. A coupling of the second-inner-volume 130 and the first-inner-volume 120 may be formed through the second-inner-opening 126. The second-inner-volume 130 provides an outer-opening 132 at the top of the body 110 and is configured to allow a developing plant 103 access through and outside of the body 110.

The body 110 may be substantially cylindrical. While the body 110 may be noticeably cylindrical in the present embodiments, it may not be limited to this shape. In these embodiments, however, the body 110 includes a circular-base 138 and a circular-top 134. The bottom-opening 124 is a partial aperture in the circular-base 138 of the body 110. Furthermore, the circular-top 134 and the circular-base 138 have equal diameter as the body 110. The circular-top 134 integrates the outer-opening 132. The body 110 is designed to be submerged partially by the nutrient solution 136 in order for the nutrient solution 136 to have access through the bottom-opening 124. The body 110 is constructed of solid material to prevent movement. Moreover, the body 110 is water-resistant so that the only access the nutrient solution 136 has may be through the bottom-opening 124. This property may also prevent the growth of fungus from contaminating other plants.

The at least one medium 128 is one or more layered material that add additional properties to the growth of the plant 103. The bottom-opening 124 allows access to exchange the at least one medium 128 and in doing so the option of replanting 503. The at least one medium 128 may receive the planting seed 142. The at least one medium 128 may be porous. The at least one medium 128 with the porous layer provides adequate pores for roots from the developing plant 103 to grow through and inside the nutrient solution 136. Once the roots from the developing plant 103 have grown into the nutrient solution 136, the wicking properties of the at least one medium 128 may no longer be essential for the growth of the plant 103. The at least one medium 128 includes a neutral pH so that the nutritional intake of the planting seed 142 may not be affected. Finally, the outer-surface 112 is opaque as to reflect sunlight. Reflecting the light may prevent the growth of algae. Desired opaque material may include plastic, Styrofoam, bioplastic, etc.

According to one embodiment, the hydroponic planting cup system 100 may be arranged as a kit 105. In particular, the hydroponic planting cup system 100 may further include a set of instructions (not shown in FIGS.). The instructions (not shown in FIGS.) may detail functional relationships in relation to the structure of the hydroponic planting cup system 100 (such that the hydroponic planting cup system 100 can be used, maintained, or the like, in a preferred manner).

Figure 2:
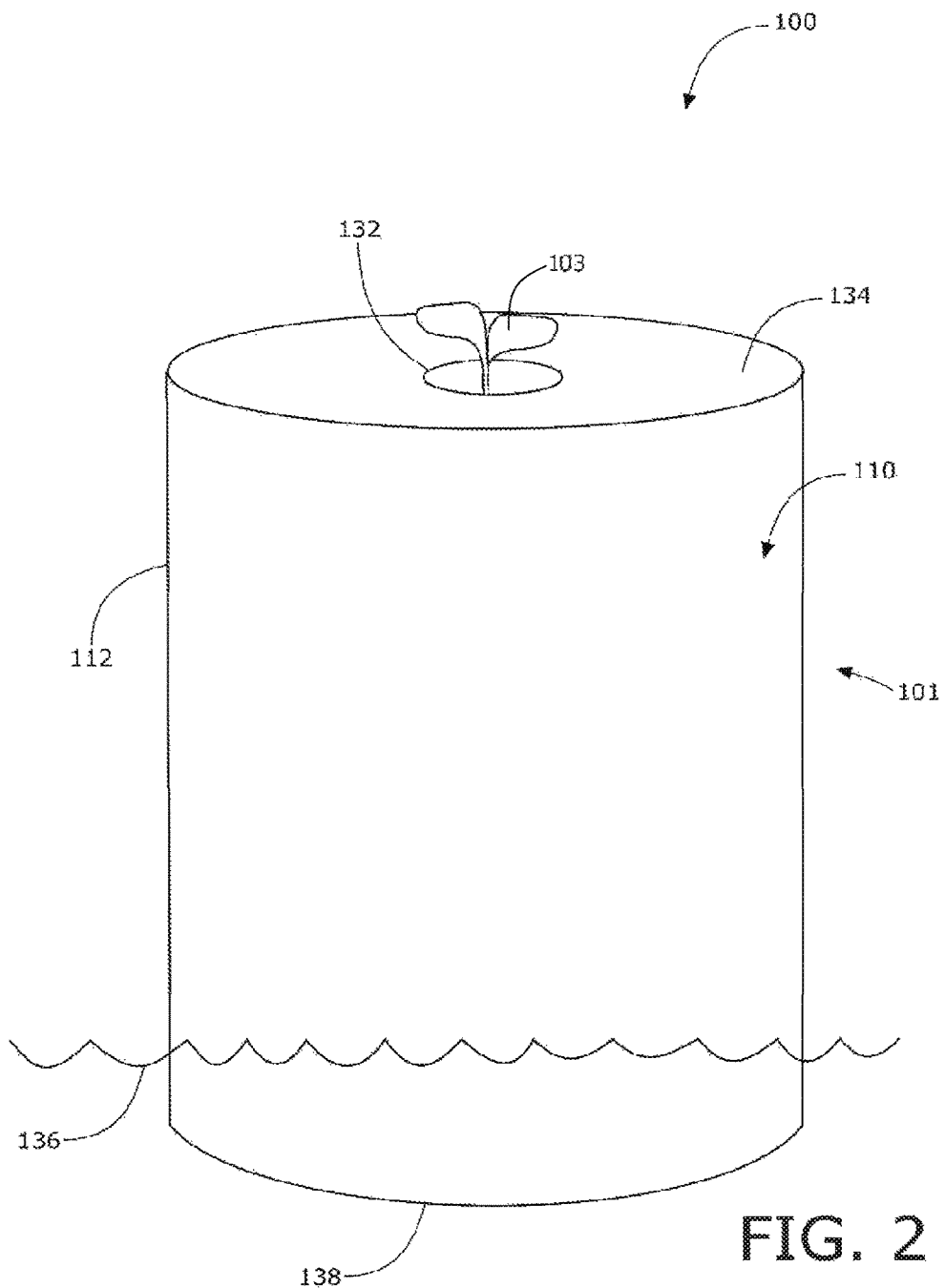
FIG. 2 is a perspective view of the hydroponic planting cup of the hydroponic planting cup system of FIG. 1, according to an embodiment of the present disclosure.

FIG. 2 shows the hydroponic planting cup system 100 of FIG. 1, according to an embodiment of the present disclosure. As above, the hydroponic planting cup system 100 may include the body 110 having the outer-surface 112. The body 110 may be formed of rigid material as to prevent light and air from contacting the at least one medium 128. Light can promote the growth of algae, and still (stagnant) moist air around the at least one medium 128, can promote the growth of fungus which are both detrimental to the plant's health.

Figure 3:
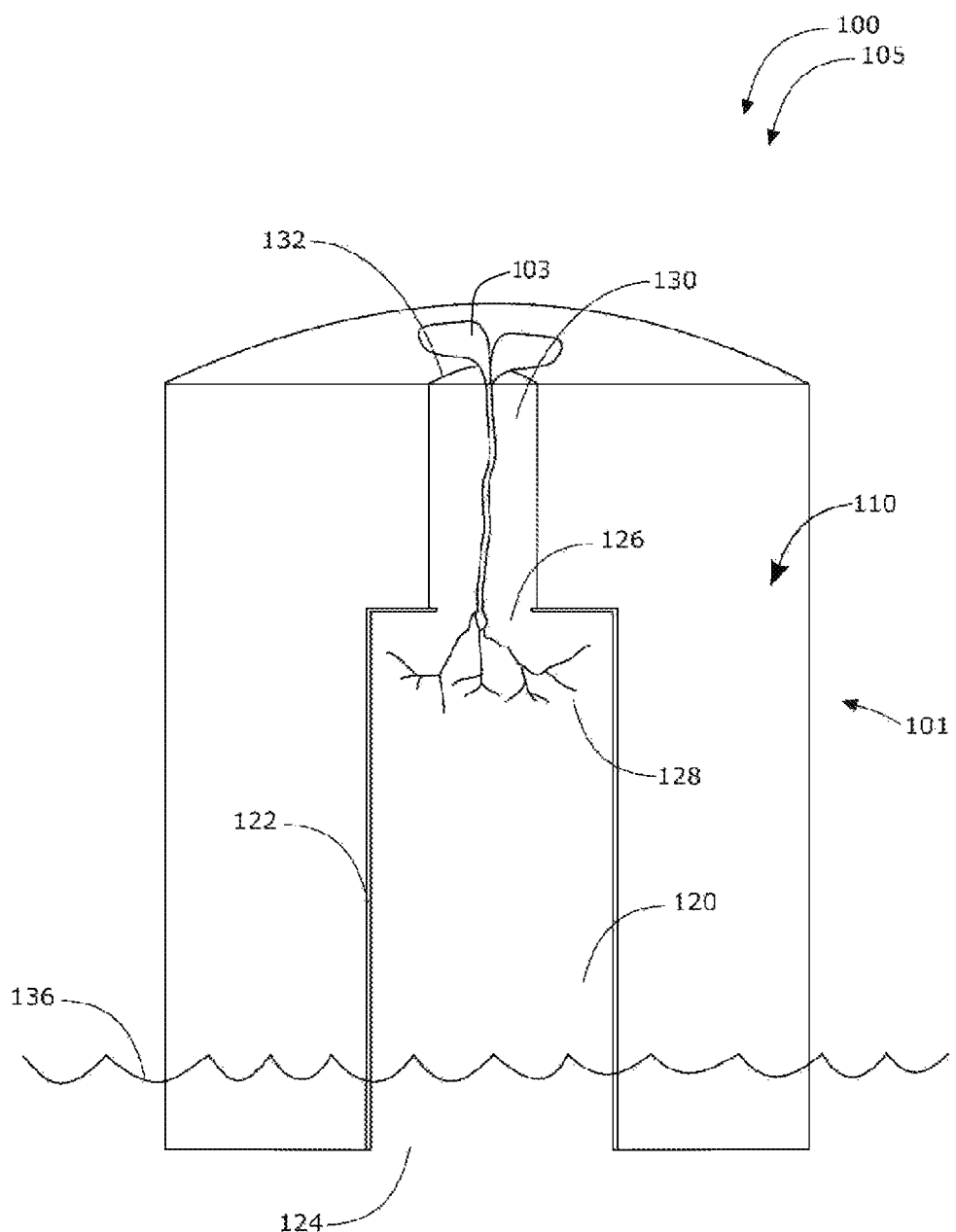
FIG. 3 is a cut-away view of the hydroponic planting cup of FIG. 1, according to an embodiment of the present disclosure.

FIG. 3 is a cut-away view of the hydroponic planting cup system of FIG. 1, according to an embodiment of the present disclosure. The at least one medium 128 is shown here. The at least one medium 128 may be made of a variety of material as long as they fulfill the specific criteria of having wicking properties, anti-fungal properties, and at least one being porous. The wicking properties of the at least one medium 128 allows the roots of the plant 103 to not be directly exposed to the nutrient solution 136 which eliminates the need for transplanting. Desirably, material made of rockwool may consist of the bottom layer of the at least one medium 128. The top layer may consist of coconut husk. It should be noted that these materials are options and does not provide limitations to the variety of material that the at least one medium 128 may comprise.

Figure 4:
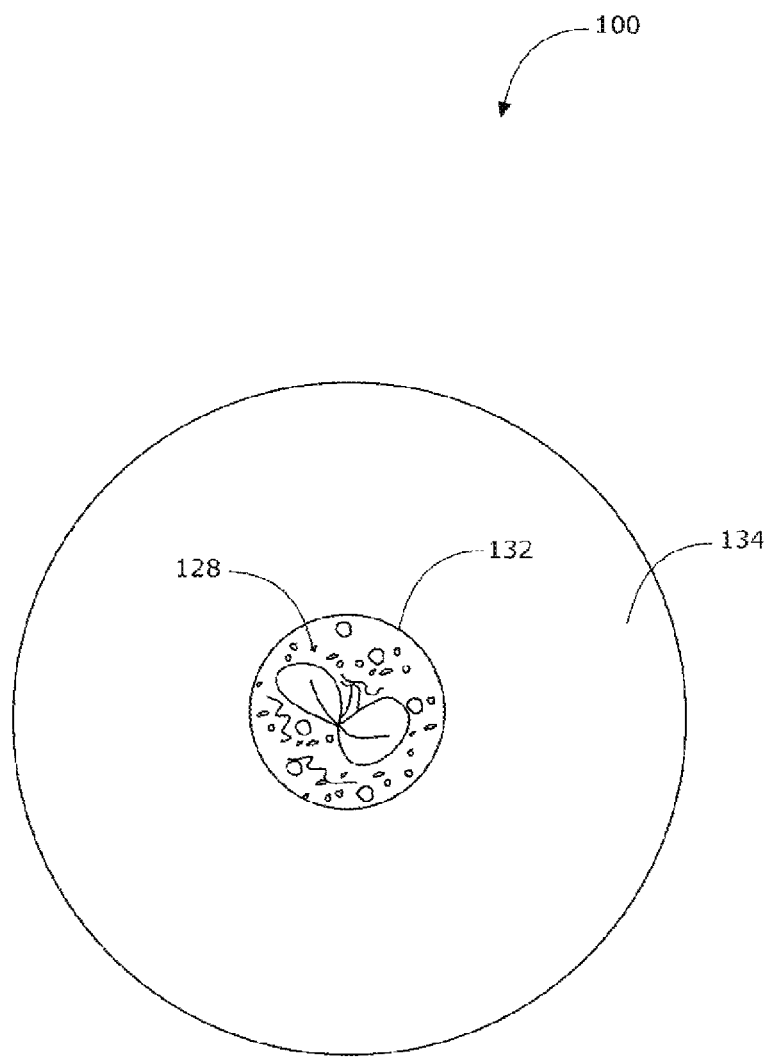
FIG. 4 is a top view of the hydroponic planting cup of FIG. 1, according to an embodiment of the present disclosure.

FIG. 4 is a top view of the hydroponic planting cup system of FIG. 1, according to an embodiment of the present disclosure. The circular-top 134 may be shown here with the outer-opening 132 located in the center. The outer-opening 132 may provide access for the developing plant, which is grown in the at least one medium 128, outside the body 110.

Figure 5:
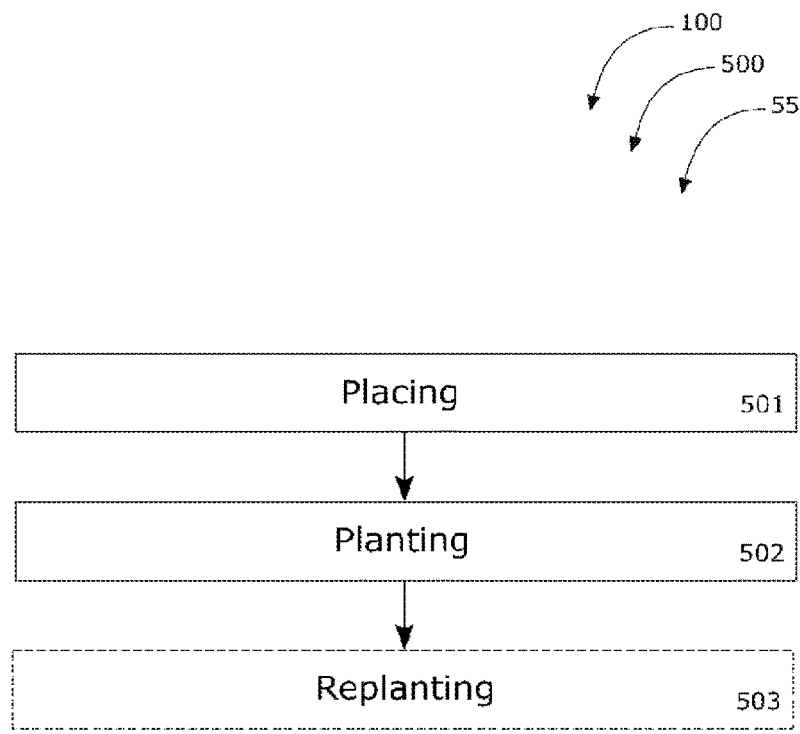
FIG. 5 is a flow diagram illustrating a method of use for the hydroponic planting cup system, according to an embodiment of the present disclosure.

FIG. 5 is a flow diagram illustrating a method 500 for hydroponic planting cup system 100, according to an embodiment of the present disclosure. In particular, the method 500 for hydroponic planting cup system 100 may include one or more components or features of the hydroponic planting cup system 100 as described above. As illustrated, the method 500 for using the hydroponic planting cup system 100 may include the steps of: step one 501, placing the hydroponic planting cup 101 in the hydroponic system; step two 502, planting the seed through the outer-opening in the at least one medium; and step three 503, replanting by removing the plant 103 from the hydroponic planting cup 101, changing out the at least one medium 128 for a new set, and repeating steps for setting up hydroponic planting system.

It should be noted that step three is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for the hydroponic planting cup system (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A hydroponic planting cup system comprising:
    a hydroponic planting cup comprising:
        a body having an outer-surface;
        a hollow first-inner-volume with an inner-surface integral to the body including;
            a bottom-opening configured to allow or remove nutrient solution from the hollow first-inner-volume,
            an inner-opening with dimensions smaller than the bottom-opening, and
            a hollow second-inner-volume configured to provide smaller dimensions with respect to the first inner-volume and in linear alignment above the hollow first-inner-volume forming a coupling through the inner-opening, the hollow second-inner-volume provides an outer-opening at the top of the body and is configured to allow a developing plant access through and outside of the body; and
        at least one medium within the hollow first-inner-volume, the at least one medium having wicking and anti-fungal properties.

2. The hydroponic planting cup system of claim 1, wherein the body is cylindrical.

3. The hydroponic planting cup system of claim 1, wherein the body includes a circular-base and a circular-top.

4. The hydroponic planting cup system of claim 3, wherein the circular-top has the same diameter as the body and wherein said circular-base has equal the same diameter as the body.

5. The hydroponic planting cup system of claim 3, wherein the circular-top integrates the outer-opening.

6. The hydroponic planting cup system of claim 1, wherein the body is designed to be submerged partially by the nutrient solution.

7. The hydroponic planting cup system of claim 1, wherein the body is constructed of solid material to prevent movement.

8. The hydroponic planting cup system of claim 1, wherein the body is water-resistant.

9. The hydroponic planting cup system of claim 1, wherein the at least one medium is material that comprises rockwool.

10. The hydroponic planting cup system of claim 9, wherein the bottom-opening allows access to exchange said at least one medium.

11. The hydroponic planting cup system of claim 9, wherein said at least one medium receives a planting seed.

12. The hydroponic planting cup system of claim 9, wherein said at least one medium includes a neutral pH.

13. The hydroponic planting cup system of claim 1, wherein said at least one medium is porous.

14. The hydroponic planting cup system of claim 13, wherein said at least one medium provides adequate pores for roots from the developing plant to grow through said at least one medium and inside said nutrient solution.

15. The hydroponic planting cup system of claim 1, wherein the outer-surface is opaque.

16. A hydroponic planting cup system comprising:
    a body having an outer-surface,
    a hollow first-inner-volume with an inner-surface integral to the body including,
        a bottom-opening configured to allow or remove nutrient solution from the hollow first-inner-volume,
        an inner-opening with dimensions smaller than the bottom-opening, and
    a hollow second-inner-volume configured to provide smaller dimensions with respect to the first inner-volume and in linear alignment above the hollow first-inner-volume forming a coupling through the inner-opening, the hollow second-inner-volume provides an outer-opening at the top of the body and is configured to allow a developing plant access through and outside of the body, and
    at least one medium within the hollow first-inner-volume, the at least one medium having wicking and anti-fungal properties,
    wherein the body is cylindrical,
    wherein the body includes a circular-base and a circular-top, wherein the circular-top has the same diameter as the body and wherein said circular-base has the same diameter as the body, wherein the circular-top integrates the outer-opening, wherein the body is designed to be submerged partially by the nutrient solution, wherein the body is constructed of solid material to prevent movement, wherein the body is water-resistant, wherein the bottom-opening allows access to exchange said at least one medium, wherein said at least one medium receives a planting seed, wherein the outer-surface is opaque.

17. The hydroponic planting cup system of claim 16, wherein the hydroponic planting cup system is arranged as a kit.

18. A method of setting up a hydroponic planting cup system;

the hydroponic planting cup system comprising:
   a hydroponic planting cup comprising:
      a body having an outer-surface;
      a hollow first-inner-volume with an inner-surface integral to the body including;
      a bottom-opening configured to allow or remove nutrient solution from the hollow first-inner-volume,
      an inner-opening with dimensions smaller than the bottom-opening, and
      a hollow second-inner-volume configured to provide smaller dimensions with respect to the first inner-volume and in linear alignment above the hollow first-inner-volume forming a coupling through the inner-opening, the hollow second-inner-volume provides an outer-opening at the top of the body and is configured to allow a plant access through and outside of the body;
   at least one medium within the hollow first-inner-volume, the at least one medium having wicking and anti-fungal properties; and
   the method comprising the steps of:
      placing the hydroponic planting cup in a hydroponic system,
      planting a seed through the outer-opening into the at least one medium, and
      growing the plant in the hydroponic planting cup system.

19. The method of claim 18, further comprising the steps of:
   removing the hydroponic planting cup from the hydroponic planting cup system,
   removing the plant from the hydroponic planting cup,
   removing the at least one medium from within the hollow first-inner-volume,
   inserting a new at least one medium,
   replacing the hydroponic planting cup in the hydroponic planting cup system,
   planting a new seed through the outer-opening into the new at least one medium, and
   growing a new plant in the hydroponic planting cup system.

* * * * *